Jan. 28, 1958   J. A. NORTHCOTE ET AL   2,821,432
TWO-STAGE LIFTING MECHANISM FOR DUMP TRAILERS
Filed Nov. 24, 1954   2 Sheets-Sheet 1
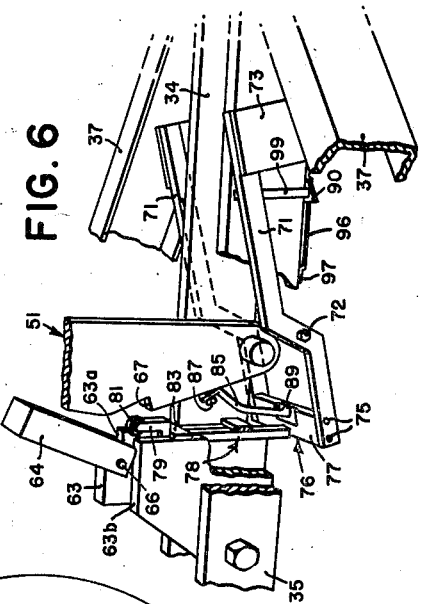
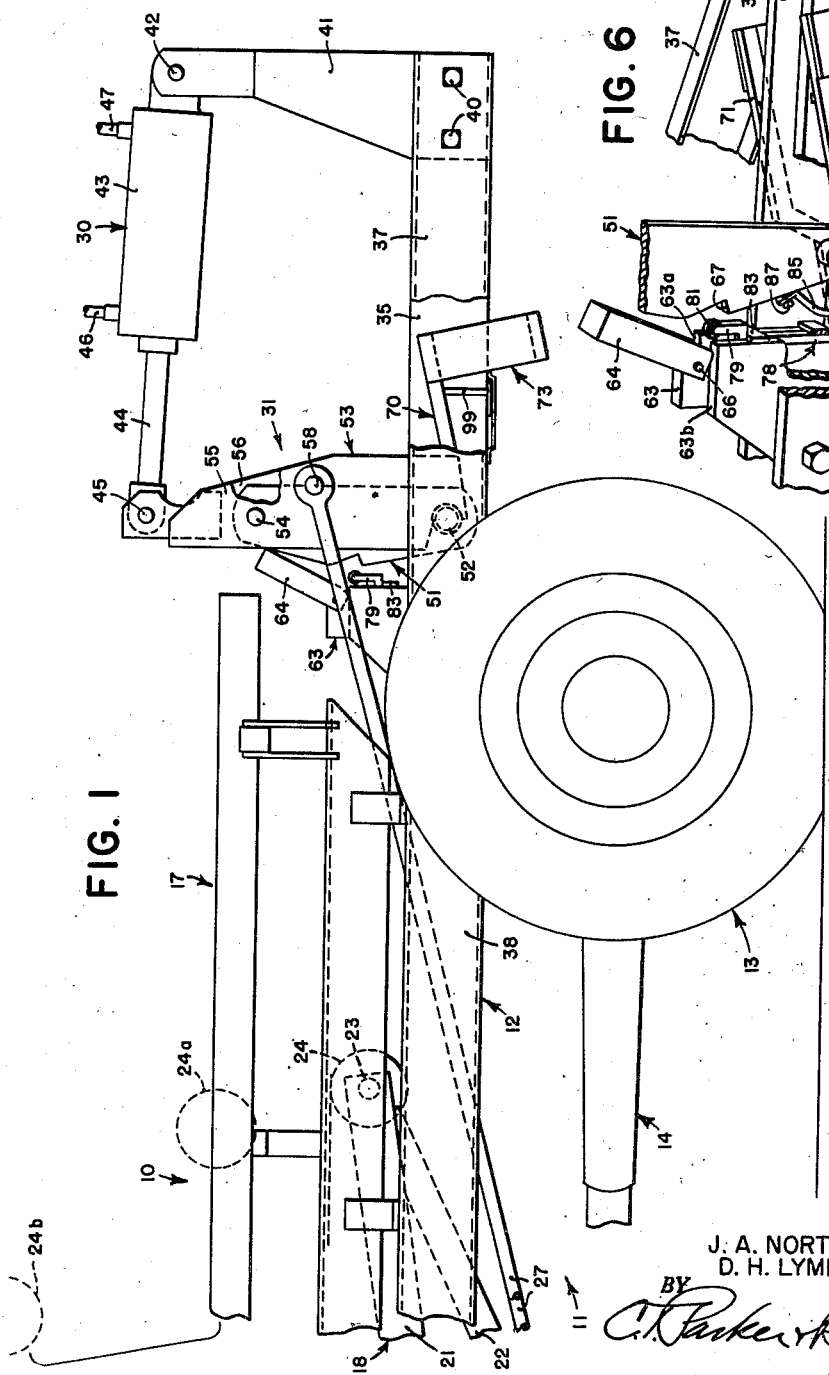
INVENTORS.
J. A. NORTHCOTE
D. H. LYMBURNER
BY
ATTORNEYS Jan. 28, 1958   J. A. NORTHCOTE ET AL   2,821,432
TWO-STAGE LIFTING MECHANISM FOR DUMP TRAILERS
Filed Nov. 24, 1954   2 Sheets-Sheet 2
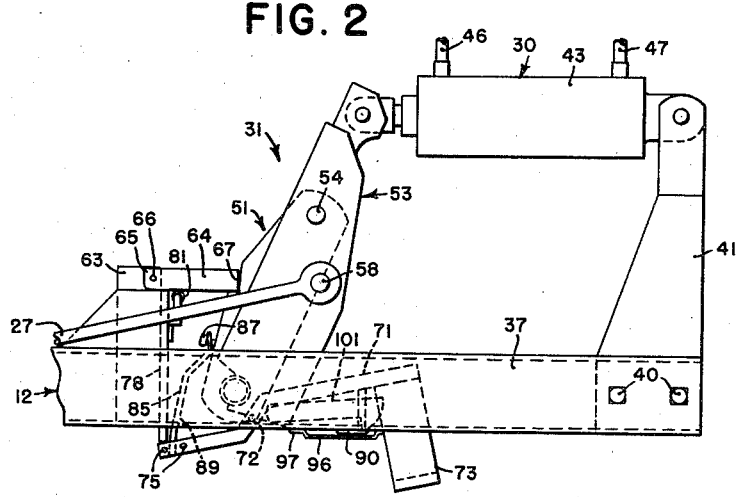
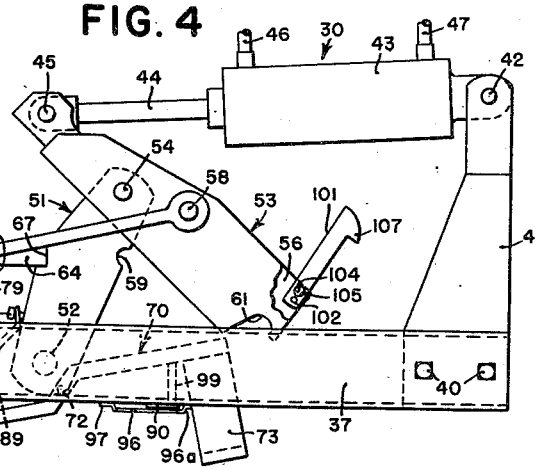
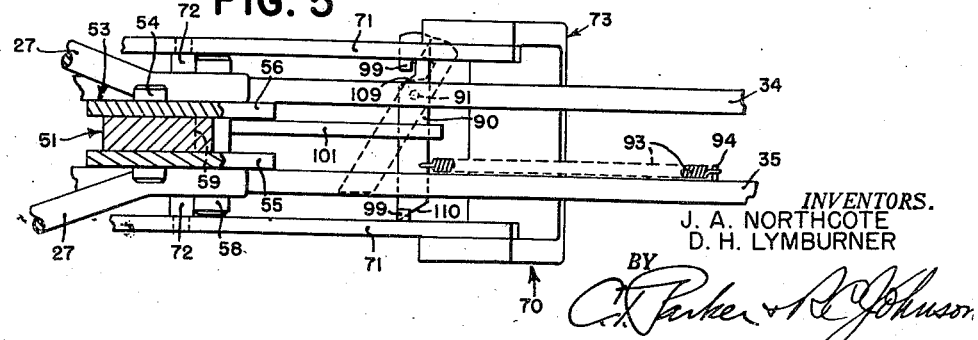
INVENTORS.
J. A. NORTHCOTE
D. H. LYMBURNER
BY
ATTORNEYS

United States Patent Office 2,821,432
Patented Jan. 28, 1958

2,821,432

TWO-STAGE LIFTING MECHANISM FOR DUMP TRAILERS

John A. Northcote, Welland, Ontario, and Douglas H. Lymburner, Fonthill, Ontario, Canada, assignors to John Deere Plow Company (Limited), Welland, Ontario, Canada, a corporation of Canada Application November 24, 1954, Serial No. 471,018

14 Claims. (Cl. 298—22)

The present invention relates generally to agricultural implements and more particularly to farm wagons, trailers and the like.

The objects and general nature of the present invention include the provision of a new and improved trailer of the dump body type, and more particularly a feature of the present invention is the provision of new and improved mechanism for actuating the dumping body through power derived from the tractor that propels the trailer. An especially important feature of this invention is the provision of a dump body actuating mechanism that is so constructed and arranged as to derive power from the usual or conventional type of hydraulic ram unit that forms a part of a large proportion of farm tractors in use today. Mostly such ram units are of standardized construction, having a predetermined length of stroke, for example, and it is an important feature of this invention to provide mechanism by which a standard farm tractor ram unit of the double-acting limited stroke type may be conveniently and readily employed for actuating the dumping body of a farm trailer or wagon even though loads of considerable weight may be carried on the dumping body.

Specifically, it is a feature of this invention to provide mechanism for raising and lowering the dumping body of a dump trailer by utilizing one stroke of the ram unit to lift the load part of the way and to utilize the next succeeding stroke of the ram unit to lift the load the rest of the way.

Another important feature of the present invention is the provision of mechanism of the type just mentioned, wherein during the first stage of the lifting action, where the load is the greatest, the linkage gives the ram a greater mechanical advantage than is provided for the second or succeeding stage of the lifting action, at which time the load has been elevated through the first stage and less power required for completing the lifting action, usually because during the first stage of the lifting action some of the load has been discharged whereby the weight to be lifted in the second stage is reduced.

A further feature of this invention is to provide a linkage of the type just mentioned, wherein its action is entirely automatic and the load may be raised and lowered, as desired, merely by operating the tractor hydraulic ram through successive full range movements.

These and other objects and advantages of the present invention will be apparent to those skilled in the art after a consideration of the following detailed description, taken in conjunction with the accompanying drawings, in which:

Fig. 1 is a side view of the front portion of a trailer of the dumping body type, showing in particular the front portion of the trailer and the associated ram-actuated operating mechanism for raising and lowering the dumping body.

Fig. 2 is a view similar to Fig. 1, showing the load-operating mechanism at the end of the first stage of the lifting action.

Fig. 3 is an enlarged fragmentary view of a portion of the lift stop releasing mechanism and a portion of the control means for said mechanism.

Fig. 4 is a similar view, showing the parts in the positions they occupy at the end of the second stage of lifting action.

Fig. 5 is a fragmentary plan view, drawn at an enlarged scale, showing a portion of the ram-actuating lifting mechanism.

Fig. 6 is a fragmentary perspective view of a portion of the lift stop releasing mechanism and control therefor.

Referring first to Fig. 1, the dumping trailer in which the principles of the present invention have been incorporated is indicated in its entirety by the reference numeral 10 and includes a running gear structure 11 having a main frame 12, front wheels 13 and a reach structure 14 interconnecting the front wheels with the rear wheels (not shown). Mounted on the main frame 12 is a dumping platform or body 17 pivotally connected at its rear end with the rear portion of the main frame 12, this being conventional construction in this kind of equipment. The dumping body 17 is raised and lowered at its front end about the rear pivotal connection with the frame 12 by means of a bell crank 18, a portion of which is shown in Fig. 1. As is usual, there is a bell crank 18 at each side of the main frame and each bell crank is made up of suitable structural members 21 and 22 interconnected at their forward ends and carrying a cross shaft 23 or the like on which a pair of rollers 24 are mounted. The rollers 24 engage the lower portion of the pivoted bed or platform 17 to provide for ease in lifting the latter, and the bell cranks 18 are actuated in the raising direction by a pair of links 27 that extend from the lower rear portions of the two bell cranks 18 forwardly in converging relation, the forward ends being connected with the ram-actuated mechanism that forms the principal part of this invention.

The main frame 12 includes a number of structural members extending forwardly beyond the front wheels 13 of the trailer to form means for supporting the tractor hydraulic ram or power unit, indicated in its entirety by the reference numeral 30, and the associated ram-actuated lifting mechanism, indicated in its entirety by the reference numeral 31. Such forwardly extending frame structure includes a pair of laterally spaced apart bars 34 and 35 rigidly connected in any suitable way at their rear ends into the main frame 12 of the trailer. The bars 34 and 35 are reenforced by side channels that extend laterally outwardly and rearwardly and are rigidly joined at their rear portions to similar channels 38 that form the side members of the main frame 12. The front portions of the frame bars 34 and 35 extend forwardly and have fastened thereto, as by bolts 40, an upstanding bracket 41 adapted to pivotally receive, as by a connecting pin 42, the hydraulic power unit 30 mentioned above. Preferably, the power unit 30 includes a cylinder 43 and a rearwardly extending piston rod 44 connected at its rear end, as by a pin 45, with the lifting linkage 31. A pair of hose lines 46 and 47 are employed to deliver hydraulic fluid under pressure to and from opposite ends of the cylinder 43.

The actuating linkage 31 mentioned above includes a first lever 51 pivotally mounted at its lower end on a pin 52 extending through the rear portions of the bars 34 and 35. A second lever 53 is pivotally mounted on a pin 54 carried at the upper end of the first lever 51. Preferably, the second lever 53 is made up of a pair of suitably interconnected side plates or arms 55 and 56 that normally are disposed on opposite sides of the first lever 51. A cross pin 58 is carried by the arms 55 and 56 and extends outwardly therefrom, as best shown in Fig. 4, to receive the front ends of the two lifting rods 27. To receive the pin 58 in the position shown in Fig. 1, the plate forming the lever 51 is cut out, as at 59, Fig. 4, and the plates 55 and 56 formed on the lever 53 are cut out, as at 61, Fig. 4, to receive the pivot member 52 when the parts are in the position shown in Figs. 1 and 2. Secured to the main frame 12 just rearwardly of the pivot 52 is a vertically extending bracket 63 rigidly secured to the main frame 12 and serving as an anchor pivotally receiving a stop member 64, the rear end of which is bifurcated so as to dispose a lug section 65 at each side of the bracket 63, these sections being apertured to receive a pivot 66 for the stop member 64. The member 64 cooperates with the lever 51 to hold the latter in the position shown in Figs. 2 and 4 when the extension of the power unit 30 acts to swing the second lever 53 from the position shown in Fig. 2 to the position shown in Fig. 4, and to this end the rear edge portion of the lever 51 is provided with a recessed portion 67 shaped to releasably receive the forward end of the stop member 64.

During certain portions of the lifting operation, it is necessary to provide means for raising the stop member 64 from the position shown in Figs. 2 and 4 upwardly to a point such that the front end of the member 64 is above the notch 67. For this purpose we provide a counterweight assembly 70 that comprises a pair of lever arms 71 pivoted, as best shown in Fig. 5, on a pair of studs 72 carried by the bars 34 and 35. The forward ends of the lever arms 71 carry a U-shaped weighted member 73, and the rear ends of the lever arms 71 are connected, as at 75, to a control plate 76 that extends between the lever arms 71, passing underneath the frame bars 34 and 35. The control plate 76 is formed with an abutment section 77 that underlies a vertically movable lift member 78 that at its upper end is provided with an offset section 79 carrying a roller 81 that lies underneath the pivoted stop member 64. Preferably, the vertically movable part 78 lies at least partially between the two side plates 63a and 63b (Fig. 6) that form a part of the bracket 63 on which the stop member 64 is pivoted. The member 78 is held in place by upper and lower cross pieces 83 (Figs. 6). A control rod 85 is provided with an upper slotted end that is loosely received on a pin 87 carried by the first lever 51, on the rear edge thereof, the lower portion of the rod 85 extending downwardly through an opening 88 in the control plate 76, this portion of the rod 85 also having a stop shoulder 89 that is adapted to engage the control plate 76 and raise the counterweighted lever 70 generally to the position shown in Fig. 1.

The operation of the device of the present invention will be described in detail below, but it will be noted at this point that when the first lever 51 is swung from the position shown in Fig. 2 to the position shown in Fig. 1, the abutment or shoulder 89 is brought down against the control plate 76, and if, for example, the counterweight assembly 70 should be in a lowered position, it will be raised by the downward movement of the rod 85 as the first lever 51 is moved to its rear or vertical position. For holding the counterweight assembly 70 in its upper position, as shown in Figs. 2 and 4, for example, even though the first lever 51 is swung into its forward position, we provide a latch arm 90 pivoted, at 91, on the frame bar 34, as shown in Fig. 4, and swingable in a generally horizontal plane just underneath the lower edges of the frame bars 34 and 35. The latch arm 90 is held in its forwardmost position, full lines, Fig. 5, by a tension spring 93 anchored at its rear end to the latch arm 90 and at its forward end to a lug 94 carried by the right-hand frame bar 35. The horizontally shiftable latch arm 90 is retained in position by a pair of guides 96 having upwardly offset ends 97 that are fixed in any suitable way to the frame bars 34 and 35, the intermediate portions of the slide bars 96 affording freedom of movement of the latch arm 90. The forward offset portion 96a of the right-hand guide bar 96 serves as stop means limiting the forward movement of the right-hand end of the latch arm 90 under the action of the tension spring 93. As will be seen from Figs. 2, 4 and 5, when the latch arm 90 is in its forwardmost position, it underlies and forms stop means for a pair of downwardly extending lugs 99 that are fixed to the arms 71 in depending relation, just rearwardly of the counterweight part 73. The latch arm 90 is adapted to be swung rearwardly, against the tension of the spring 93, by means of a trip lever 101 that is pivoted, as at 102, on the lower end of the bar 56 and mounted for movement relative thereto, being restrained against excessive movement by a pin 104 disposed in an opening 105 in the trip lever 101. The pin 104 is carried by the plate 56. A hook-like end 107 on the trip lever 101 serves to engage and swing the latch arm 90 rearwardly when the second lever member 53 is swung from the position shown in Fig. 4 back to the position shown in Fig. 2. When the latch arm 90 is swung to its dotted-line position, as shown in Fig. 5, the vertical lugs 99 on the counterweight unit 70 no longer engage or rest on the latch arm 90, and hence the unit is free to swing in a counterclockwise direction, as will be explained in detail below. To insure that the lugs 99 will clear the latch arm 90 when the same is swung into its dotted-line position, the end portions of the latch arm 90 are cut out, as at 109 and 110 (Fig. 5).

The operation of the actuating mechanism and associated parts of the present invention will now be described.

The bed or platform 17 of the trailer is shown in its lowered position in Fig. 1, and when it is desired to discharge the load therefrom, as by swinging the front end of the bed or platform upwardly about its rear pivotal connection with the running gear of the trailer, the power unit 30 is first actuated in a retracting direction, the piston rod 44 moving inwardly of the cylinder 43. This swings the combined levers 51 and 53 about the pivot 52 into the position shown in Fig. 2, pulling forwardly on the links 27 and raising the front end of the bell cranks 18, carrying the rollers 24. In this the first stage of lifting, the power unit 30 acts with a mechanical advantage of about 2 to 1. In the preferred structure shown in the drawings, the mechanical advantage is somewhat greater than 2 to 1, since the moment arm of the unit 30 is slightly more than twice as long as the moment arm of the lift links 27, that is, the perpendicular distance from the links 27 to the pivot 52. When the unit 30 is fully retracted, the parts have reached the position shown in Fig. 2, and at this time the latch or detent 64 has dropped behind the lever 51, the front end of the latch 64 seating in the notch 67, thus preventing any return movement of the first lever 51 to its vertical position. The second stage of the lifting action occurs when the unit 30 is extended, and when this occurs, the first lever 51 remains stationary and the pivot 54 becomes a fulcrum by which the extension of the piston rod 44 rearwardly swings the second link 53 from the position shown in Fig. 2 to the position shown in Fig. 4, thus imparting an additional forward movement to the links 27 and thus completing the raising of the bed or platform 17. The pivots, links and other parts are so constructed and arranged that the first lifting stage elevates the platform lifting rollers 24 only to the position shown in dotted lines in Fig. 1 and indicated by the reference numeral 24a, but during the second lifting stage, the bell cranks 18 are operated to swing the rollers 24 upwardly to the position indicated in Fig. 1 by the reference numeral 24b. It will thus be seen that when the load is the heaviest, the power unit 30 operates at the greater mechanical advantage, the mechanical advantage being reduced, and hence the amount of raising per unit of movement of the unit 30 is increased, during the second lifting stage, when the parts are swung from the position shown in Fig. 2 to the position shown in Fig. 4.

When lowering the platform or bed 17, the power unit 30 is operated to retract the piston rod, moving the parts from the position shown in Fig. 4 to the position shown in Fig. 2. During the last portions of the movement of the lever 53 relative to the lever 51, the catch 107 on the member 101 engages the trip lever 90, moving the same from the full-line position in Fig. 5 to the dotted-line position. Thus, the trip lever 90 is moved out from underneath the lugs 99, and as soon as this occurs, the weight 73 causes the levers 71 to swing about the pivot 72, urging the vertically movable lift members 78 upwardly whereby, when the end of the retracting movement of the unit 30 is reached and the pressure on the outer end of the pivoted stop member 64 released, the weight 73 becomes effective to raise the member 64 into an upper position such that, when the power unit 30 is again extended, permitting the levers 51 and 53 to move from the position shown in Fig. 2 back to the position shown in Fig. 1 to completely lower the platform, the front end of the stop member 64 merely slides along the rear edge of the lever 51, as will be seen from Fig. 1. It is necessary, during the second stage of the lowering operation as just described, to restore the weighted member 73 to its elevated position, and this is accomplished by the movement of the first lever 51 from the position shown in Fig. 2 back to the position shown in Fig. 1, this movement of the lever 51 acting through the push rod 85 and the shoulder 89 to push down on the rear end of the pivoted assembly 70 and raise it to the position shown in Figs. 2 and 4. As soon as the lower ends of the lugs 99 clear the trip lever 90, the latter is freed to swing back into its full-line position (Fig. 5) by the spring 93, which occurs as soon as the rocking of the lever 53 from the position shown in Fig. 2 back to the position shown in Fig. 1 takes up the lost motion of the trip lever 101, as provided by the pin 104 in the enlarged opening 105, and pulls the end 107 upwardly away from the trip lever 90. As can be seen from Figs. 2 and 3, the lower end of the push rod 85 moves loosely through the opening 88 so that when the counterweight assembly 70 is held, as by the trip lever 90, in an elevated position, the forward movement of the first lever 51 is not affected, nor is the lower end of the push rod 85 pulled out of position relative to the abutment bar 77.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A body tilting mechanism comprising a double-acting hydraulic ram unit adapted to be extended and retracted, means actuated by a retracting movement of said ram unit to raise the body part way, said means including a pair of pivotally interconnected parts movable together in one direction from one position to another by said retracting movement, and a second means actuated by an extending movement of said ram unit to raise the body the remainder of its raising movement, said second means including stop means preventing movement of one of said parts in the opposite direction and the other of said parts which is moved farther in said one direction by said extending movement.

2. A body tilting mechanism comprising a double-acting power unit, means including a lever movable in opposite directions and connected to tilt said body a part of its total movement in one direction by movement of said lever in one of its directions of movement, means operated by movement of said lever in its other direction to complete the movement of said body in its said one direction, and means connecting said lever with said power unit for operation in opposite directions by said power unit.

3. In a damping vehicle, body tilting means including a lever having a first portion shiftable in one direction about a first fulcrum and in the opposite direction about another fulcrum spaced from said first fulcrum, double-acting power means connected with said first portion to move the latter first in said one direction and then in said opposite direction, and means adapted to be moved successively in the same direction connected with a second portion of said lever at the opposite side of said other fulcrum from said first portion.

4. The invention set forth in claim 3, further characterized by a means including a movable part providing said fulcrums, and means selectively holding said movable part in one of two positions.

5. In a dumping vehicle having a tiltable body movable between raised and lowered position, mechanism operable through one range of movement to shift said tiltable body part of the way from one position to the other position, and operable through a second range of movement to shift said tiltable body the remainder of the way from said one position to said other position, a double-acting hydraulic ram unit, and means connecting said ram unit so that extension of the latter shifts said mechanism through one of its ranges of movement and retraction of said ram unit shifts said mechanism through the other of its ranges of movement.

6. In a dumping vehicle, a supporting frame, a tilting body pivoted to said support adjacent one end, lever means pivoted on said support and connected to raise the other end of said tilting body, a power unit movable in opposite directions, means operated by movement of said unit in one direction to swing said lever means to shift said body in one direction through a part of its range of movement between lowered and raised positions, said means including a pair of pivotally interconnected parts movable together in said one direction, and means operated by movement of said power unit in its other direction to shift said body through the remainder of its range of movement in said second named one direction, last mentioned means including one of the aforesaid parts and stop means engageable with the other of said parts.

7. In a dump vehicle having a tiltable dump body, body tilting means comprising a first lever, a second lever pivoted at a generally intermediate point on the swingable portion of said first lever, said intermediate point being on said second lever, a double-acting power unit connected with said second lever and operative when actuated in one direction to shift both of said levers together, means connected with said second lever to be actuated by movement of the latter for tilting said dump body, and means holding said first lever against movement in the other direction, whereby a second actuation of said power unit acts through said second lever to impart additional tilting movement to said dump body.

8. In a dump vehicle having a tiltable body, a support, a first lever pivoted at one end thereon, a second lever pivoted at a generally intermediate point on the other end of said first lever, said intermediate point being on said second lever, means connected with said first and second levers to cause both levers to swing together when said second lever is moved in one direction, a double-acting power unit connected with said second lever to shift the latter in opposite directions, body tilting means connected with said second lever, and lock means connectible with said first lever for holding the latter against movement when said second lever is moved in its opposite direction, whereby said first lever serves as a fulcrum for said second lever when the latter is moved in said opposite direction to impart an additional movement to said body tilting means.

9. In a dumping vehicle having a tiltable body, body tilting mechanism comprising a double-acting power unit, a lever connected adjacent one end with said power unit, a shiftable member connected with said lever adjacent the intermediate portion thereof, body tilting means connected with said lever at a point thereon at the side of said shiftable member connection opposite the connection of said lever with said power unit, means causing said lever and shiftable member to be shifted together in one direction to a first position, when said power unit is operated generally in said one direction, and a locking means acting against said shiftable member to hold the latter against movement whereby operation of said power unit in the opposite direction shifts said body tilting means an additional amount in said one direction into a second position.

10. The invention set forth in claim 9, further characterized by means connected to act between said lever and said locking means to release the latter when said lever is moved from said second position to said first position.

11. In a dumping vehicle, a body tilting mechanism, comprising a double-acting power unit, a pair of interconnected parts adapted to be moved together in one direction and one pivotally mounted on the other and operative, when said other part is held against movement in the other direction, to swing relative to said other part, means connecting one end portion of said one part with said power unit, body tilting means connected with said one part at the side of the point of pivotal connection between said parts opposite said one end portion, a lock releasably connected with said other part to hold the latter against movement in said other direction, and means controlled by said one part for releasing said lock.

12. The invention set forth in claim 11, further characterized by said last mentioned means comprising a gravity-operated part connected to shift said lock to a released position, and a latch movable by said one part to control said gravity-operated part.

13. The invention set forth in claim 12, further characterized by means operated by said other part to move said gravity-operated part to an elevated position.

14. The invention set forth in claim 11, further characterized by said last mentioned means comprising a gravity-operated part connected to shift said lock to a released position, means connected between said other part and said gravity-operated part to raise the latter out of lock-shifting position, and releasable spring biased means to hold said gravity-operated part in its raised position, and means movable by said one part to shift said spring biased means to release said gravity-operated part.

References Cited in the file of this patent

UNITED STATES PATENTS

| | | |
|---|---|---|
| 2,452,516 | Brick | Oct. 26, 1948 |
| 2,454,481 | Rumsby | Nov. 23, 1948 |
| 2,667,381 | Tripodi | Jan. 26, 1954 |